United States Patent
Batchelor

(10) Patent No.: US 8,550,116 B2
(45) Date of Patent: Oct. 8, 2013

(54) TWIN POWER VALVE WITH INTEGRATED PRESSURE BALANCE

(75) Inventor: Mark Batchelor, Newport (GB)

(73) Assignee: Carlisle Brake Products (UK) Ltd., Pontypool (GB)

(*) Notice: Subject to any disclaimer, the term of this patent is extended or adjusted under 35 U.S.C. 154(b) by 175 days.

(21) Appl. No.: 13/262,009

(22) PCT Filed: Mar. 31, 2009

(86) PCT No.: PCT/IB2009/005135
§ 371 (c)(1), (2), (4) Date: Sep. 29, 2011

(87) PCT Pub. No.: WO2010/112949
PCT Pub. Date: Oct. 7, 2010

(65) Prior Publication Data
US 2012/0037246 A1 Feb. 16, 2012

(51) Int. Cl.
*F16K 11/065* (2006.01)
(52) U.S. Cl.
USPC ............ 137/625.25; 137/625.69; 60/561; 60/576; 60/581
(58) Field of Classification Search
USPC .......... 137/625.2, 625.67, 625.69, 625.25; 60/561, 581, 576; 91/517; 303/119.1, 119.2
See application file for complete search history.

(56) References Cited

U.S. PATENT DOCUMENTS

| | | | |
|---|---|---|---|
| 3,019,816 A | | 12/1957 | Larsen et al. |
| 3,166,890 A | * | 1/1965 | Krehbiel .................. 60/402 |
| 3,461,671 A | * | 8/1969 | Venema ................... 60/561 |
| 3,605,410 A | * | 9/1971 | Herriott .................. 60/535 |
| 3,670,626 A | * | 6/1972 | Olson et al. .............. 91/3 |
| 3,773,084 A | * | 11/1973 | Bernhoft et al. ........ 137/627.5 |
| 3,927,603 A | | 12/1975 | Bernhoft .................. 91/513 |
| 4,408,805 A | * | 10/1983 | Edwards et al. .......... 303/9.61 |
| 5,133,386 A | * | 7/1992 | Magee ................ 137/625.65 |
| 5,243,820 A | * | 9/1993 | Shimoura et al. .......... 60/452 |
| 5,394,701 A | * | 3/1995 | Durant et al. ............. 60/533 |
| 5,397,175 A | * | 3/1995 | Matsunaga et al. ....... 303/117.1 |

OTHER PUBLICATIONS

International Search Report and Written Opinion from counterpart International Application No. PCT/IB2009/005135, mailed Sep. 11, 2009 (14 pages).

* cited by examiner

*Primary Examiner* — Craig Schneider
*Assistant Examiner* — Jessica Cahill
(74) *Attorney, Agent, or Firm* — Wood, Herron & Evans, LLP

(57) ABSTRACT

A twin power valve assembly (10) for a hydraulic braking system having a single body (16) with twin power valve arrangements, each having a spool (36, 36') with a longitudinally extending passageway (36D, 36D') for providing a modulation of the pressure applied to the brakes, and an integral balance piston (60, 60') contained within the body (10) that equalizes the pressure applied to the left and right hand brakes when both brakes are applied.

9 Claims, 6 Drawing Sheets

TWIN POWER VALVE WITH INTEGRATED PRESSURE BALANCE

TECHNICAL FIELD OF THE INVENTION

The present invention relates to power valves for hydraulic braking systems and, in particular, twin power valves with an integrated pressure balance assembly for use in a hydraulic braking system for agricultural vehicles.

BACKGROUND OF THE INVENTION

Agricultural vehicles, such as tractors, typically include a pair of braked rear wheels with a right hand brake pedal and a left hand brake pedal. In such systems, the right hand brake pedal can be applied alone causing just the right hand rear brake to be applied, and similarly the left hand brake pedal can be applied alone causing just the left hand brake to be applied. Applying say just the right hand brake, whilst simultaneously steering the front wheels fully to the right, enables the tractor to turn more sharply than by using steering alone. This can be particularly useful when turning a tractor with a tractor mounted implement, such as a plough at a headland (i.e., the unploughed land at ends of furrows or near a fence) of a field. To engage both of the rear brakes simultaneously, such as for normal service braking, the right and left hand brake pedals are simultaneously applied.

A problem of agricultural brake systems of the above type is that when both brake pedals are simultaneously applied, a system must be present to balance the pressure being applied to the right and left hand brakes. Absent such a system, increased brake pressure in one side compared to the other would result in unexpected turning of the vehicle when both brakes are applied. One such known brake system is disclosed in U.S. Pat. No. 4,408,805.

SUMMARY OF THE INVENTION

An object of the present invention is to provide a braking system that includes an integral pressure balance arrangement to ensure that a uniform pressure is applied to both the right and left hand brakes whilst both brake pedals are simultaneously applied.

The invention will now be described, by way of example only, with reference to the accompanying drawings and detailed description.

DETAILED DESCRIPTION OF THE DRAWINGS

Figure 1:
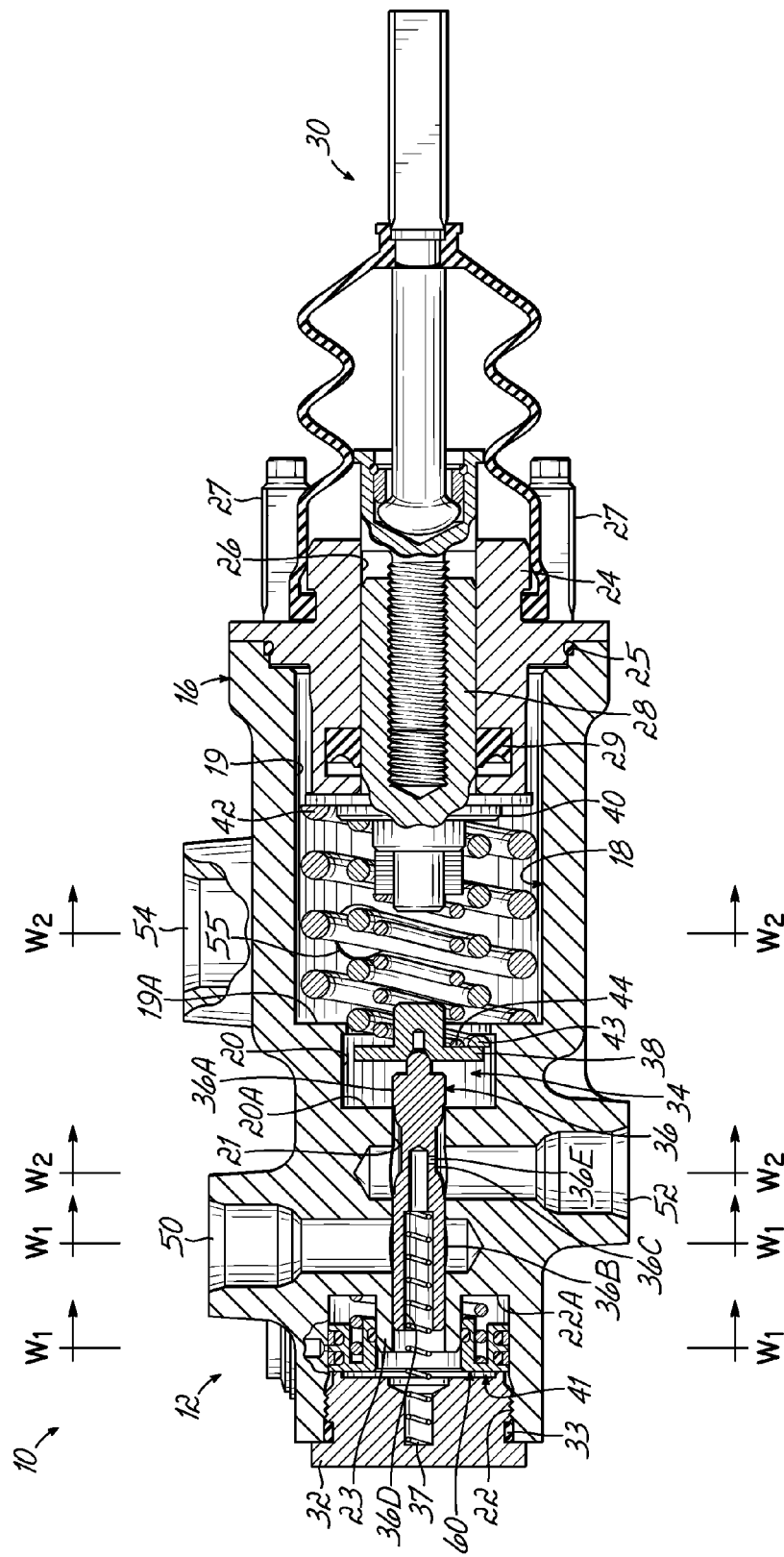
FIG. 1 is a cross-section view of a left hand power valve arrangement of a twin power valve assembly according to the present invention, taken along line X-X of FIG. 3.

With reference to FIGS. 1 through 4 there is shown a twin power valve assembly 10 having a single body 16 which includes a left hand power valve arrangement 12 and a right hand power valve arrangement 14. The components of right hand power valve arrangement 14 are substantially identical to the components of left hand power valve arrangement 12 and as such, only left hand power valve arrangement 12 will be described in detail. With reference to FIG. 1 there is shown a cross sectional view of left hand power valve arrangement 12.

The body 16 is formed as a unitary component, and can be formed as a machined casting although that need not be the case. For example, body 16 could be machined from a solid. Body 16 includes a stepped bore 18 having a rear section 19, a mid section 20, a spool section 21 and a balance section 22. Extending into balance section 22 is an annular projection 23 of body 16.

A closing flange 24 with a seal 25 is received within, and closes off, the rear section 19 of bore 18. As used herein, "rear" refers to the right when looking at the figures and "front" refers to the left when looking at the figures. Closing flange 24 is held in place by bolts 27, and includes a flange bore 26 with a seal 29, the flange bore 26 slideably receiving a plunger 28. A plunger cap 40 is secured to the front of plunger 28. Secured over the closing flange 24 in a known manner is a pushrod assembly 30 that engages plunger 28 through flange bore 26. Spring 42 acts to bias plunger 28 to the right when viewing FIGS. 1, 1A, 1B and 1C and reacts against an annular region 19A of the rear section 19 of stepped bore 18 and plunger cap 40. The balance section 22 of stepped bore 18, which is at the front of body 16, is closed off by a plug 32 having a seal 33.

Slidably received in the mid section 20 and spool section 21 of bore 18 is a spool assembly 34 comprising a spool 36, and a spool plate 38 engaging the rear of spool 36. Spool 36 includes an enlarged diameter rear portion 36A having a tapered diameter that is slightly less than the diameter of spool section 21 at the leading edge and is substantially the same diameter as the spool section at the trailing edge, an enlarged diameter front portion 36B having a diameter that is substantially the same as the diameter of spool section 21, and a reduced diameter narrow central portion 36C. A longitudinal passageway 36D extends from the front end of spool 36 and communicates with a radial oil passageway 36E formed in central portion 36C. A pair of springs 43, 44 act on spool plate 38 and plunger cap 40 as will be further explained below.

Figure 2:
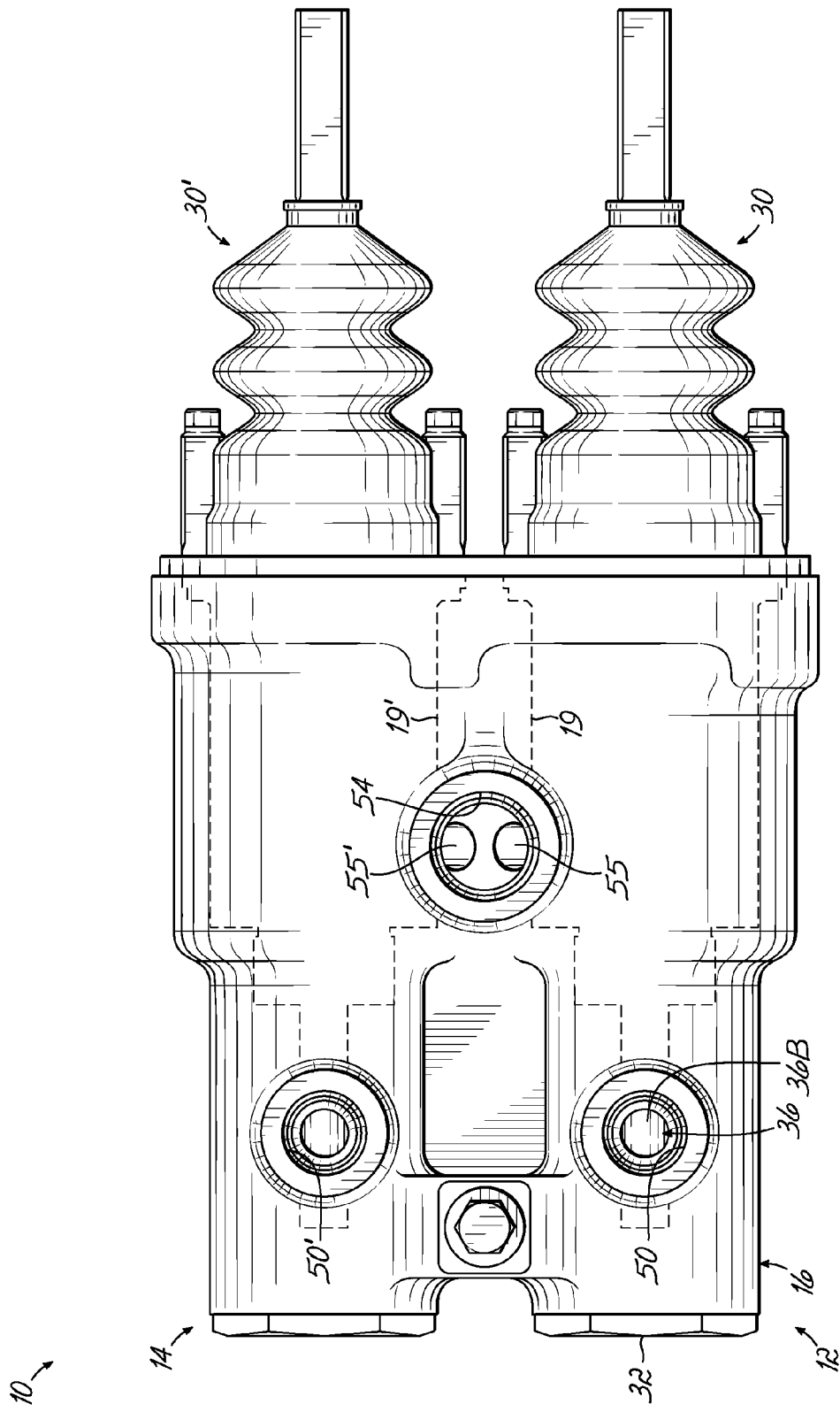
FIG. 2 is a top view of the twin power valve assembly of FIG. 1.
Figure 3:
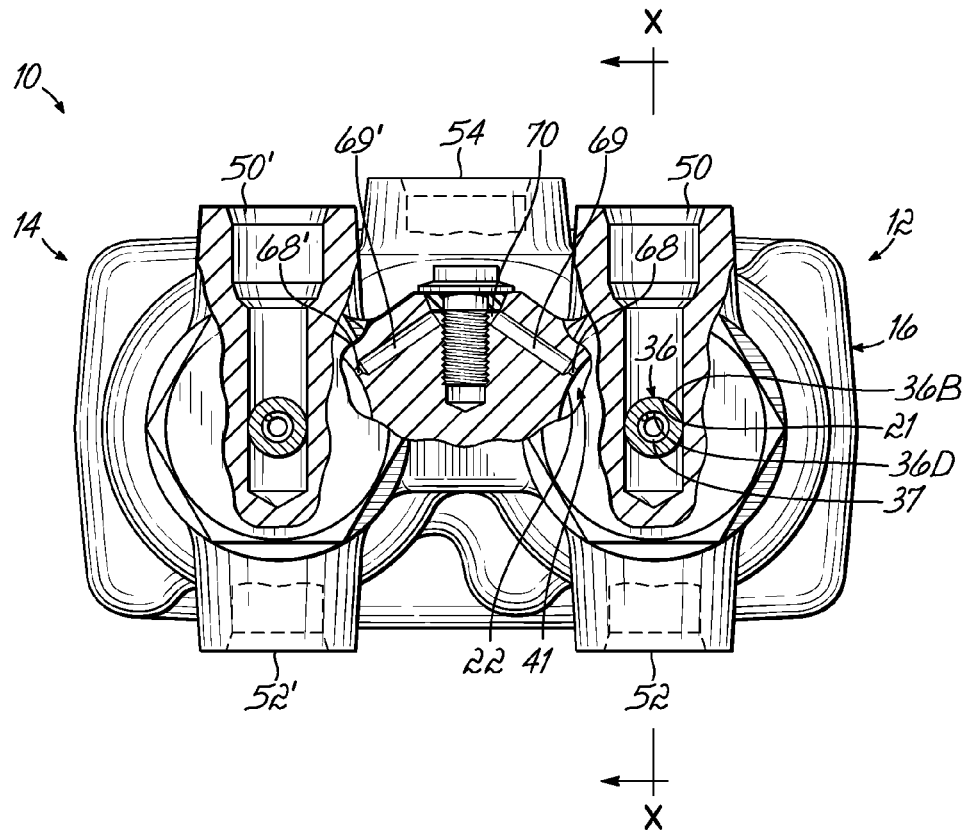
FIG. 3 is an end view of the twin power valve assembly of FIG. 1 further including cut away views taken at the sections labeled $W_1$ in FIG. 1.
Figure 4:
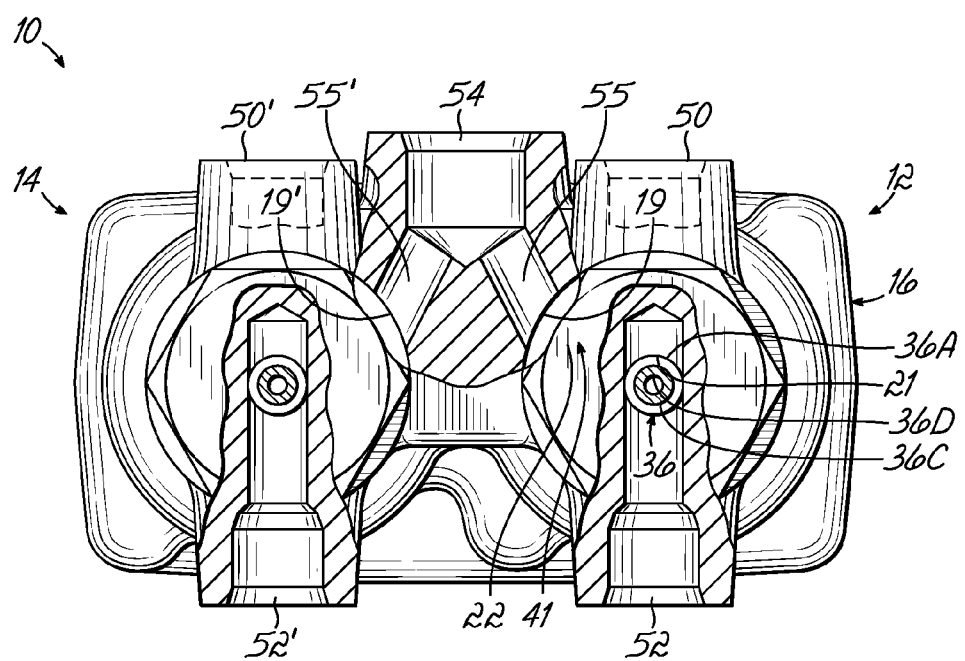
FIG. 4 is an end view of the twin power valve assembly of FIG. 1 further including cut away views taken at the sections labeled $W_2$ in FIG. 1.

Pressure port 50 intersects and is in fluid communication with spool bore 21. Brake port 52, which is positioned rearwardly of pressure port 50, likewise intersects and is in fluid communication with spool bore 21. Tank port 54, however, is positioned between the left and right hand power valve arrangements (as best seen in FIGS. 2 and 3), and is fluidly connected by hole 55 to the rear section 19 of stepped bore 18, and is also fluidly connected to rear section 19' (not shown) by a hole 55'. The upper ends of holes 55 and 55' terminate at the base of the tank port 54, which is formed in the body 16 and is the only tank port of the body. Advantageously, this means that only a single connection is required to the body to connect holes 55 and 55' to the tank chamber (not shown).

Figure 1A:
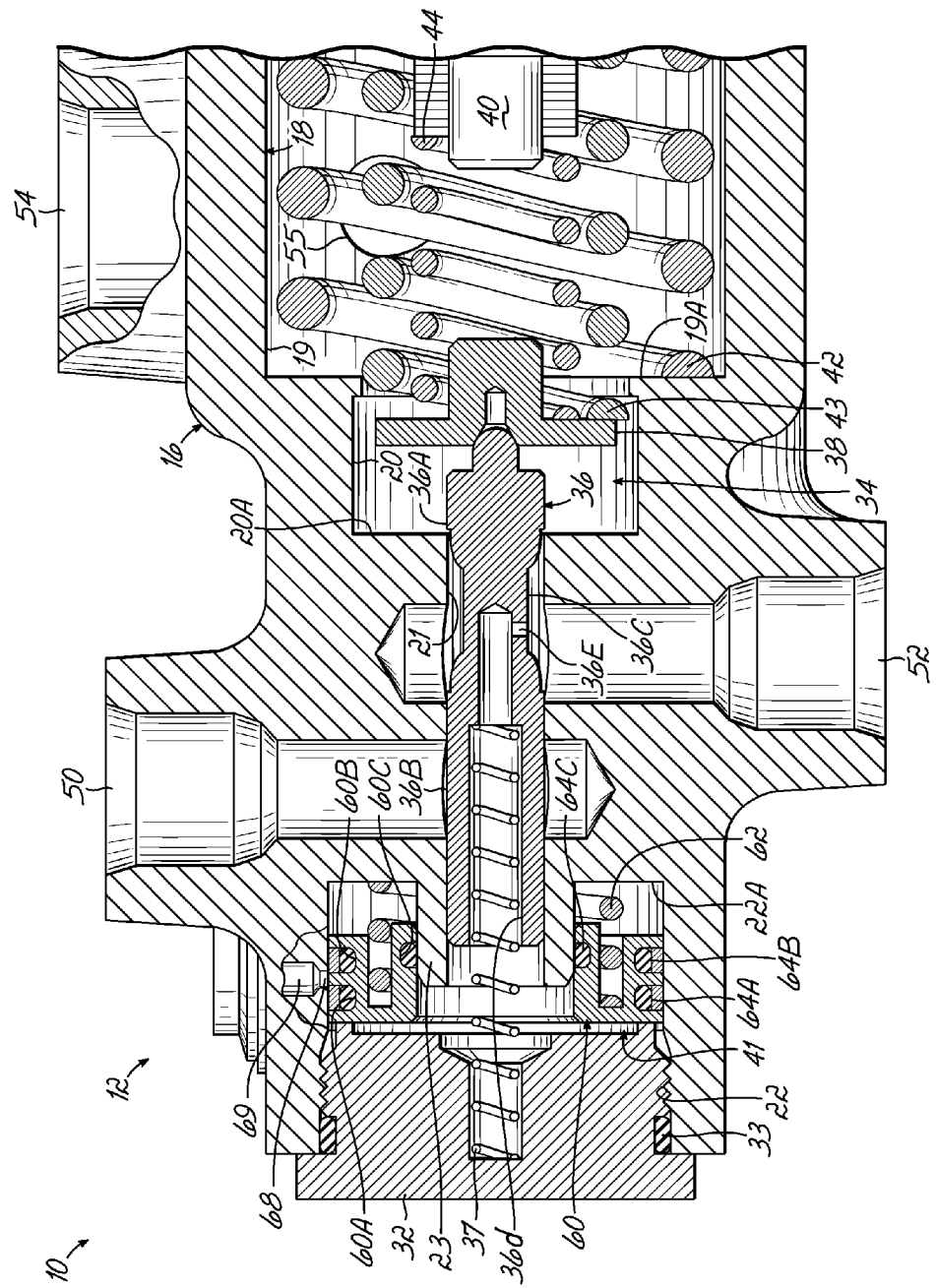
FIG. 1A is an enlarged view of part of FIG. 1 with the assembly in its passive position.

Slidably received in the balance section 22 of stepped bore 18, and slidably positioned over annular projection 23 of body 16, is an annular balance piston 60. Together, plug 32, balance bore 22 and balance piston 60 form a first balance chamber 41. Balance piston 60 includes two piston lands 60A and 60B in spaced apart relationship along the outer diameter, and one piston land 60C along the inner diameter. Land 60A includes seal 64A, land 60B includes seal 64B, and land 60C includes seal 64C. Between seals 64A and 64B, when the system is in its passive position as shown in FIGS. 1 and 1A, is a radial hole 68 that is in fluid communication with a passageway 69. Passageway 69 is, in turn in fluid communication with a second balance chamber 70 (best seen in FIG. 3). Spring 62 acts to bias balance piston 60 to the left when viewing FIGS. 1, 1A, 1B and 1C, and reacts against balance piston 60 and an annular region 22A of the balance section 22 of bore 18. To prevent the trapping of any pressure between the balance piston 60 and annular region, a hole (not shown) is provided that vents that region to the tank.

In operation of the left hand power valve arrangement 12, pressurised hydraulic fluid is supplied to pressure port 50. FIGS. 1 and 1A show the position of the various components when the power valve arrangement is in a passive state, i.e., when the brakes have not been applied. In this state, the enlarged front portion 36B of spool 36 is positioned over the intersection of the pressure port 50 and spool bore 21 thereby preventing the flow of pressurised fluid from pressure port 50 to brake port 52. Rather, in the passive state brake port 52 is vented to tank port 54 via spool bore 21 and around the enlarged rear portion 36A of spool 36.

Operation of the left hand brake pedal (not shown) alone by, for example, partially depressing the brake pedal, causes push rod assembly 30 to move to the left when viewing FIGS. 1 and 1A, thereby moving plunger 28 to the left and compressing springs 42, 43 and 44. However, compression of springs 43 and 44 reacts on spool plate 38, thereby moving spool 36 to the left. As spool 36 moves to the left (as best seen in FIG. 1C), narrow central portion 36C moves into the intersection between pressure port 50 and spool bore 21, placing spool bore 21 into fluid communication with pressure port 50. This, in turn, places brake port 52 into fluid communication with pressure port 50, and causes the left brake to be applied. However, when push rod assembly is only partially depressed, as shown in FIG. 1C, the pressurised fluid from pressure port 50 can also pass around enlarged rear portion 36A and partially escape to tank port 54 via hole 55, and thereby reduce the pressure communicating to brake port 50. It will also be appreciated that pressurisation in brake port 52 is transmitted through radial oil passageway 36E and the longitudinally extending passageway 36D to first balance chamber 41. The pressure in first balance chamber 41 acts on spool 36 and, in combination with spring 37, cause spool 36 to move to the right until such time as the forces acting on spool 36 are balanced, thereby modulating the pressure to brake port 52.

Figure 1B:
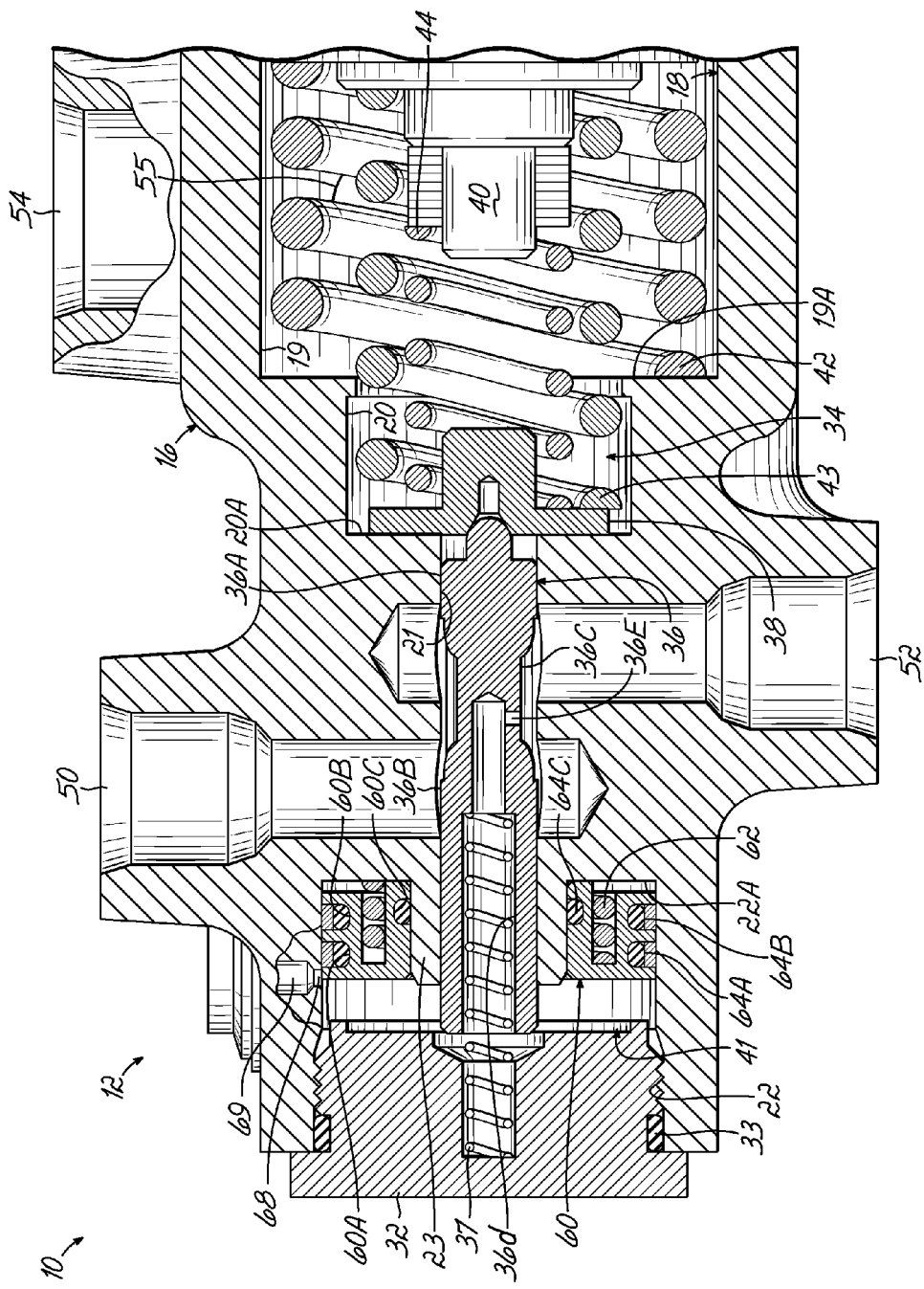
FIG. 1B is another enlarged view of part of FIG. 1 with the assembly in a fully applied position and the left and right hand brakes balanced.
Figure 1C:
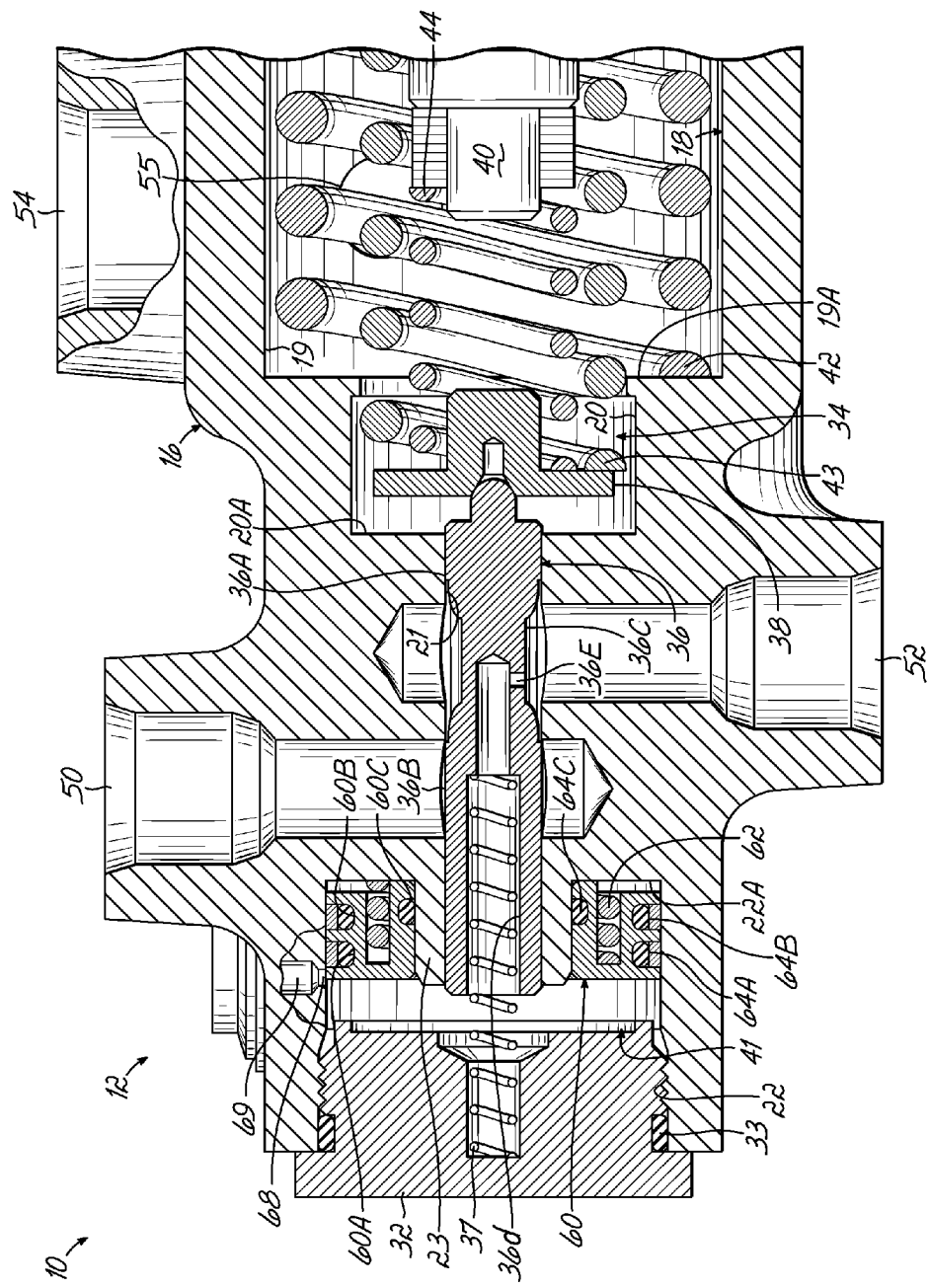
FIG. 1C is yet another enlarged view of part of FIG. 1 with the assembly in a modulated position and the left and right hand brakes balanced

If left hand brake pedal is fully depressed, as shown in FIG. 1B, however, spool plate 38 contacts the rear face 20A of mid section 20 of bore 18, and rear portion 36A is fully received in spool section 21, thereby preventing pressurised fluid entering spool bore 21 pressure port 50 from venting out of spool bore 21 to tank port 54. Brake port 52 will then receive the full pressure from pressure port 50, and hence the left hand brake will be fully applied.

It will be appreciated that pressure in first balance chamber 41 will also act on balance piston 60, causing balance piston 60 to move to the right. This, in turn compresses spring 62 until the force from compressed spring 62 balances the force caused by the pressure on balance piston 60, a known value based on the spring constant of spring 62. When the pressure in first balance chamber 41 reaches a predetermined level, based on the known spring constant of spring 62, seal 60A will pass over hole 68 thereby placing hole 68 into fluid communication with first balance chamber 41. The pressure in balance chamber 41 is then transmitted through hole 68 and passageway 69 to second balance chamber 70, and then to passageway 69' and hole 68' in the left hand power valve arrangement 12. If the left hand brake pedal has not been depressed, or not depressed sufficiently to cause seal 60A' to pass over hole 68', then pressure transmitted from left hand first balance chamber 31 to second balance chamber 70 is not transmitted through hole 68' to left hand first balance chamber 31', and left and right power valve arrangements 12, 14 are hydraulically isolated from one another.

If, however, both the left and right hand brake pedals have been depressed sufficiently to cause seal 60A to pass over hole 68 and seal 68A' to pass over hole 68', then both the left hand first balance chamber 41 and the right hand first balance chamber 41' will be in fluid communication with second balance chamber 70. As a result, the pressure in each of the first balance chambers 41 and 41' will be the same, the pressure in left hand brake port 52 and right hand brake port 52' will be the same, and the pressure applied to the left and right hand brakes will also be the same.

In other words, if the pressure in both of the first balance chambers 41, 41' exceed a predetermined level sufficient to overcome the spring constant of spring 62, 62', the left and right hand power brake arrangements 12, 14 will be in fluid communication and equal pressure is provided to both brake ports 52, 52'. If, on the other hand, the pressure in either of the first balance chambers 41, 41' does not exceed a predetermined level sufficient to overcome the spring constant of spring 62, 62', then the left and right hand power brake arrangements 12, 14 will be hydraulically isolated from one another.

Thus, whilst the twin power valve assembly permits an operator to selectively apply the left hand brake or the right hand brake, it also ensures that when both brakes are applied, equal pressure will be applied to both brakes preventing unintended turns or unequal braking.

Inclusion of balance piston 60 also provides a safety feature in the event that one brake circuit were to fail. In a hydraulic system in which the left and right hand brakes are balanced through permanent fluid communication between the brakes, failure of one of the circuits results in a failure of both, as fluid in the active circuit will be vented via the fluid connection through the failed circuit. In the present system, however, if one brake circuit fails, such as the left hand power valve arrangement 12, the pressure in first balance chamber 41' will stay at the atmospheric pressure, i.e., the tank port pressure, and will be below the predetermine level necessary to overcome spring constant of spring 62'. Balance piston 60' will therefore remain in the passive position isolating left hand power valve arrangement 12 from right hand power valve arrangement 14. As each of the left and right hand power valve arrangements 12, 14 has an independent pressure port 50' and 50, respectively, even if one brake circuit fails, the other circuit will continue to operate as transfer passage 68 will be sealed by piston seals 64A and 64B in the failed side, thereby preventing pressurized oil from the operative side from leaking out of the failed circuit.

For the avoidance of doubt the term "left" and "right" is merely being used to distinguish similar components, and should not be regarded as defining a particular spatial relationship of one component relative to another.

What is claimed is:

1. A twin power valve assembly for a hydraulic braking system having a single body comprising:
   a left hand power valve arrangement contained within the body having a left hand first balance chamber, and a right hand power valve arrangement having a right hand first balance chamber;
   a pressure port contained within the body;
   a left hand spool assembly contained within the left hand power valve arrangement operable by an operator for selectively placing the pressure port into fluid communication with a left hand brake port, and a right hand spool assembly contained within the right hand power arrangement operable by an operator for selectively placing the pressure port into fluid communication with a right hand brake port; and
   the left hand brake port (52) contained within the body in fluid communication with the left hand first balance chamber, and the right hand brake port contained within the body in fluid communication with the right hand first balance chamber; and
   a balance valve arrangement contained within the body having a second balance chamber, a left hand balance valve that places the left hand first balance chamber into fluid communication with the second balance chamber when the pressure in the left hand first balance chamber exceeds a predetermined value and hydraulically isolates the left hand first balance chamber from the second balance chamber when the pressure in the left hand first balance chamber is less than the predetermined value, and a right hand balance valve that places the right hand first balance chamber into fluid communication with the second balance chamber when the pressure in the right hand first balance chamber exceeds a predetermined value and hydraulically isolates the right hand first balance chamber from the second balance chamber when the pressure in the right hand first balance chamber is less than the predetermined value.

2. A twin power valve assembly as defined in claim 1 in which there is a left hand pressure port, the left hand spool assembly for placing the left hand pressure port into fluid communication with the left hand brake port, and a right hand pressure port, the right hand spool assembly for placing the right hand pressure port into fluid communication with the right hand brake port.

3. A twin power valve assembly as defined in claim 1 in which the left hand brake port is in fluid communication with the left hand first balance chamber by a passageway formed in the left hand spool assembly, and the right hand brake port is in fluid communication with the right hand first balance chamber by a passageway formed in the right hand spool assembly.

4. A twin power valve assembly as defined in claim 1 in which the left hand first balance chamber and the right hand first balance chamber are in fluid communication with the second balance chamber by respective left hand and right hand passageways formed in the body.

5. A twin power valve assembly as defined claim 4, in which the left hand brake port is in fluid communication with the left hand first balance chamber by a passageway formed in the left hand spool assembly, and the right hand brake port is in fluid communication with the right hand first balance chamber by a passageway formed in the right hand spool assembly.

6. A twin power valve assembly as defined in claim 1 in which the left hand balance valve and right hand balance valve comprise an annular balance piston biased by a spring toward a closed position in which the respective left and right hand first balance chamber are not in fluid communication with the second balance chamber.

7. A twin power valve assembly as defined claim 6, in which the left hand brake port is in fluid communication with the left hand first balance chamber by a passageway formed in the left hand spool assembly, and the right hand brake port is in fluid communication with the right hand first balance chamber by a passageway formed in the right hand spool assembly.

8. A twin power valve assembly as defined in claim 6, in which the left hand first balance chamber and the right hand first balance chamber are in fluid communication with the second balance chamber by respective left hand and right hand passageways formed in the body.

9. A twin power valve assembly as defined claim 8, in which the left hand brake port is in fluid communication with the left hand first balance chamber by a passageway formed in the left hand spool assembly, and the right hand brake port is in fluid communication with the right hand first balance chamber by a passageway formed in the right hand spool assembly.

* * * * *

UNITED STATES PATENT AND TRADEMARK OFFICE
CERTIFICATE OF CORRECTION

PATENT NO.         : 8,550,116 B2
APPLICATION NO.    : 13/262009
DATED              : October 8, 2013
INVENTOR(S)        : Mark Batchelor Page 1 of 1

It is certified that error appears in the above-identified patent and that said Letters Patent is hereby corrected as shown below:

In the Specification:
Column 1,
Line 62, reads "hand brakes balanced" and should read -- hand breaks balanced; --.

Column 4,
Lines 27-28, read "if the pressure in both . . . exceed a" and should read -- if the pressure in both . . . exceeds a --.

In the Claims:
Claim 1, Column 5,
Line 17 reads "the left hand brake port (52) contained" and should read -- the left hand brake port contained --.

Claim 5, Column 6,
Line 13 reads "A twin power valve assembly as defined claim 4, in which" and should read -- A twin power valve assembly as defined in claim 4, in which --.

Claim 6, Column 6,
Lines 23-24 read "left and right hand first balance chamber are not in" and should read -- left and right hand first balance chambers are not in --.

Claim 7, Column 6,
Line 26 reads "A twin power valve assembly as defined claim 6, in which" and should read -- A twin power valve assembly as defined in claim 6, in which --.

Claim 9, Column 6,
Line 38 reads "A twin power valve assembly as defined claim 8, in which" and should read -- A twin power valve assembly as defined in claim 8, in which --.

Signed and Sealed this
Sixth Day of May, 2014

Michelle K. Lee
*Deputy Director of the United States Patent and Trademark Office*